(12) United States Patent
Fassolette et al.

(10) Patent No.: US 10,754,363 B2
(45) Date of Patent: Aug. 25, 2020

(54) MIXING UNIT, RELATED MIXER TAP, AND METHOD FOR MANUFACTURING SUCH A MIXER TAP

(71) Applicant: VERNET, Ollainville (FR)

(72) Inventors: Pierre-Olivier Fassolette, Corbeil Essonnes (FR); Mathieu Draber, Milly la Foret (FR)

(73) Assignee: VERNET, Ollainville (FR)

( * ) Notice: Subject to any disclaimer, the term of this patent is extended or adjusted under 35 U.S.C. 154(b) by 119 days.

(21) Appl. No.: 16/068,653

(22) PCT Filed: Jan. 6, 2017

(86) PCT No.: PCT/EP2017/050257
§ 371 (c)(1),
(2) Date: Jul. 6, 2018

(87) PCT Pub. No.: WO2017/118724
PCT Pub. Date: Jul. 13, 2017

(65) Prior Publication Data
US 2019/0048565 A1 Feb. 14, 2019

(30) Foreign Application Priority Data
Jan. 8, 2016 (FR) ..................... 16 50140

(51) Int. Cl.
*G05D 23/13* (2006.01)
*F16K 11/078* (2006.01)
(Continued)

(52) U.S. Cl.
CPC ........ *G05D 23/134* (2013.01); *F16K 11/0787* (2013.01); *F16K 17/38* (2013.01);
(Continued)

(58) Field of Classification Search
CPC .... G05D 23/02; G05D 23/021; G05D 23/022; G05D 23/13; G05D 23/1306;
(Continued)

(56) References Cited

U.S. PATENT DOCUMENTS 3,153,933 A * 10/1964 Freismuth ................ G01K 5/44
60/527
4,458,710 A * 7/1984 Weaver ................... F16K 17/38
137/15.21

(Continued)

FOREIGN PATENT DOCUMENTS

FR 2 876 433 A1 4/2006

OTHER PUBLICATIONS

International Search Report in connection with International Patent Application No. PCT/EP2017/050257 dated Apr. 11, 2017.

*Primary Examiner* — Jonathan Bradford
(74) *Attorney, Agent, or Firm* — Knobbe, Martens, Olson & Bear, LLP (57) ABSTRACT

A mixing unit with a mixer tap for mixing two fluids and a method for manufacturing the mixer tap for mixing fluids are disclosed. The mixing unit has a cartridge, which is provided with a coupling base having an inlet for a first inflow, an inlet for a second inflow, and an outlet for an outflow obtained by mixing the inflows. The mixing unit also has a housing designed to be placed in a coupled position with the coupling base. The housing is designed to change the rate of the first inflow and/or second inflow on the basis of the temperature of the outflow. The mixing unit also includes an attachment for attaching a housing to the coupling base. The attachment allows for movement of the additional housing, in relation to the cartridge, between the coupled position and a separated position.

10 Claims, 8 Drawing Sheets

(51) Int. Cl.
*F16K 17/38* (2006.01)
*F16K 27/04* (2006.01)
*G05D 23/02* (2006.01)
*E03C 1/04* (2006.01)

(52) U.S. Cl.
CPC ......... *F16K 27/045* (2013.01); *G05D 23/022* (2013.01); *G05D 23/132* (2013.01); *E03C 1/041* (2013.01); *F16K 11/0782* (2013.01); *G05D 23/13* (2013.01)

(58) Field of Classification Search
CPC ................ G05D 23/132; G05D 23/134; F16K 11/0787; F16K 17/38; F16K 27/045; E03C 1/041
See application file for complete search history.

(56) References Cited

U.S. PATENT DOCUMENTS

| | | | | |
|---|---|---|---|---|
| 4,913,101 A | * | 4/1990 | Sliger | F01P 7/16 123/41.1 |
| 4,982,704 A | * | 1/1991 | Sliger | F01P 7/16 123/41.1 |
| 5,853,023 A | | 12/1998 | Orlandi | |
| 6,257,493 B1 | | 7/2001 | Chamot | |
| 2002/0096571 A1 | * | 7/2002 | Kunze | F01P 7/16 236/34.5 |
| 2002/0100510 A1 | | 8/2002 | Otelli | |

* cited by examiner

MIXING UNIT, RELATED MIXER TAP, AND METHOD FOR MANUFACTURING SUCH A MIXER TAP

PRIORITY AND CROSS REFERENCE TO RELATED APPLICATIONS

This application is the U.S. National Phase Application under 35 U.S.C. § 371 of International Application No. PCT/EP2017/050257, filed Jan. 6, 2017, designating the U.S. and published as WO 2017/118724 A1 on Jul. 13, 2017, which claims the benefit of French Application No. FR 1650140, filed Jan. 8, 2016. Any and all applications for which a foreign or a domestic priority is claimed is/are identified in the Application Data Sheet filed herewith and is/are hereby incorporated by reference in their entireties under 37 C.F.R. § 1.57.

FIELD

The present invention relates to a mixing unit, related mixer tap for mixing fluids.

SUMMARY

The present disclosure relates to a mixing unit, related mixer tap, and method for manufacturing such a mixer tap.

BRIEF DESCRIPTION OF THE DRAWINGS

The invention will be better understood upon reading the description which follows, given solely by way of a non-limiting and non-exhaustive example and with reference to the drawings, wherein.

DETAILED DESCRIPTION

The present invention relates to a mixing unit, a mixer tap comprising such a mixing unit and method of manufacturing such a mixer tap.

The invention relates to the field of sanitary taps. In particular, so-called "mixer" taps make it possible to issue a mixed flow of running water by mixing a flow of hot water and a flow of cold water into a cartridge mounted in the body of the tap. The respective flow rates of the cold water and hot water flows entering the cartridge may be adjusted by means of a control lever in order to allow adjustment of the temperature of the mixed flow by rotation of the lever about an axis, and the flow rate of the mixed flow by rotation of the lever about a second axis.

The cartridge usually comprises a pair of perforated ceramic disks, wherein one is fixed, while the other is movable under the action of the lever while being in flat contact, sliding and sealed with the fixed disk. Depending on the position of the mobile disk on the fixed disk, channels are formed to allow admission of cold and hot water flows within the cartridge, with a more or less significant flow, and thus bring about their mixing in the formation of the mixed flow.

Some known cartridges may be provided with a separate additional housing, which is attached to the cartridge. For example, patent FR-B1-2 876 433 describes a cartridge for a mixer tap equipped with an additional thermostatic module coupled sealingly to the base of the cartridge. The additional thermostatic module is provided with thermostatic means allowing, when the temperature of the mixed flow exceeds a predetermined threshold value, the closure of the passage of the hot water before it enters the cartridge, in order to automatically limit the flow temperature.

In general, in practice, sealingly coupling the cartridge and its additional housing may be difficult, since the body is generally of a relatively narrow diameter, which complicates the gripping of the additional housing.

U.S. Pat. No. 5,853,023 A discloses a multifunction mixing unit for a sanitary apparatus, comprising a cartridge with a coupling base. Different means of positioning additional housings with various functions in rotation and in translation are provided. These positioning means include, in particular, indentations provided on the coupling base of the cartridge, and complementary shapes provided on the additional housings. This complementarity of these shapes does not facilitate the mounting of the cartridge and its housing in the body of a tap, insofar as it is necessary that the additional housing and the cartridge are positioned in a correct relative orientation in order to be coupled, which may be difficult to obtain in a tap body.

US 2002/100510A1 discloses a mixer tap equipped with a mixing unit comprising a cartridge and an additional housing, wherein the additional housing is fixed by screw or nut to the cartridge. As the housing and the cartridge are thus linked, the sealing means provided between them are loaded even when the housing and the cartridge are not introduced into the tap body.

Accordingly, the object of the invention is to provide a new mixing unit for a mixer tap, which is easier to assemble.

The invention relates to a mixing unit according to the invention for a mixer tap, comprising a cartridge, which includes mixing means for mixing fluid flows, and provided with a coupling base having a first inlet for a first fluid inflow having a first temperature, a second inlet for a second fluid inflow having a second temperature that is higher than the first temperature, and an outlet for an outflow obtained by using mixing means that mix the first inflow and the second inflow.

The mixing unit of the invention also comprises an additional housing, which is designed to be placed in a coupling position with the coupling base, wherein the additional housing contains thermostatic means which, when the additional housing is in the coupling position, are designed to change the flow rate of the first inflow and/or the second inflow as a function of the temperature of the outflow.

According to the invention, the mixing unit further comprises fastening means for arranging the additional housing in an attachment configuration with the additional housing on the coupling base, a configuration in which the attachment means allow the further housing to move relative to the cartridge, between the coupling position and a position of separation of the additional housing relative to the cartridge. In addition, in the position of separation, the attachment means are designed to retain the additional housing in the attachment configuration.

By virtue of the invention, the additional housing may be positioned on the cartridge prior to its introduction into a tap body. The mixing unit may thus be pre-assembled before being put into place in the body of the tap. The attachment means retain, i.e. grip, the additional housing, so that the additional housing remains integral with the coupling base when the additional housing is in the attachment configuration. The additional housing may be manipulated along with the cartridge when it is introduced into the tap body, which facilitates assembly. Finally, the attachment means of the additional housing on the cartridge allow movement of movement of the latter, wherein the attachment means do not interfere with the movement of the additional housing between the cartridge and the bottom of the tap body. This makes it possible to guarantee the tightness of the coupling of the cartridge and of the additional housing, while relieving the attachment means of their function of attaching the cartridge to the additional housing, a function which is then ensured by the clamping mentioned. Nevertheless, when the mixing unit in the attachment configuration is not inserted and tightened in the tap body, the additional housing is not obliged to remain in the coupling position, which makes it possible to avoid premature wear of the mixing unit before it is introduced into the tap body.

According to other advantageous features of the invention, taken separately or in combination:
the cartridge has a generally cylindrical shape defining a cartridge axis and ending with the coupling base which is traversed by the cartridge axis, wherein the attachment means are so designed that the movement of the additional housing is effected in a direction of travel that is substantially parallel to the cartridge axis;
the coupling base comprises means for positioning the additional housing in rotation with respect to the cartridge about the cartridge axis, wherein the positioning means allow translation of the additional housing with respect to the cartridge, along the length of the cartridge axis;
the positioning means comprise a parapet protruding from the coupling base and parallel to the cartridge axis, wherein the additional housing comprises, at its periphery, a recessed portion to receive the parapet;
the attachment means comprise at least one retaining claw, that is integral with the coupling base, and at least one lug protruding from the additional housing, wherein the lug is designed to be retained between the claw and the base of the coupling in an attachment configuration, wherein the claw is positioned to allow movement of the additional housing between two end positions defining the movement along the cartridge axis;
the attachment means comprise, on the one hand, at least one lug protruding from the additional housing, and, on the other hand, a hook, arranged on the coupling base, and designed to receive the lug in the attachment configuration, in order to maintain this lug within it while allowing a movement of the lug in the hook between two extreme positions defining the movement;
the mixing unit comprises at least one seal of the coupling between the additional housing and the coupling base, wherein the placing in the coupling position of the additional housing causes a compression of the seal making it possible to ensure the tightness of the coupling of the additional housing on the coupling base;
wherein the additional housing comprises:
a first side intended to bear against the coupling base when the additional housing is in the coupling position,
a second side opposite to the first side, and
at least one first conduit and a second conduit passing through the housing from the first side to the second side, and designed to be respectively connected to the first inlet and the second inlet on the first side when the additional housing is in the coupling position.

The invention also relates to a mixer tap comprising a receiving body of a mixing unit as defined above, wherein the receiving body comprises an annular wall defining a body axis and designed to receive the mixing unit within it by sliding it along the body axis. The receiving body also comprises a coupling plate of the additional housing, which is integrally arranged within the annular wall, as well as clamping means, along the body axis of the mixing unit against the coupling plate, allowing, on the one hand, placing the additional housing in the coupling position with the coupling base, and, on the other hand, placing of the additional housing in the coupling position with the coupling plate.

The invention finally relates to a method of manufacturing a mixer tap as defined above, wherein the method comprises the following successive steps:
a) placing the additional housing in the separated position on the coupling base in the attachment configuration by means of the attachment means which are then loaded,
b) introducing the mixing unit thus assembled into the receiving body until the mixing unit abuts against the coupling plate,
c) clamping the mixing unit against the coupling plate, in order to move the additional housing from the separated position to the coupling position with the coupling base, so that the attachment means are no longer loaded.

Figure 1:
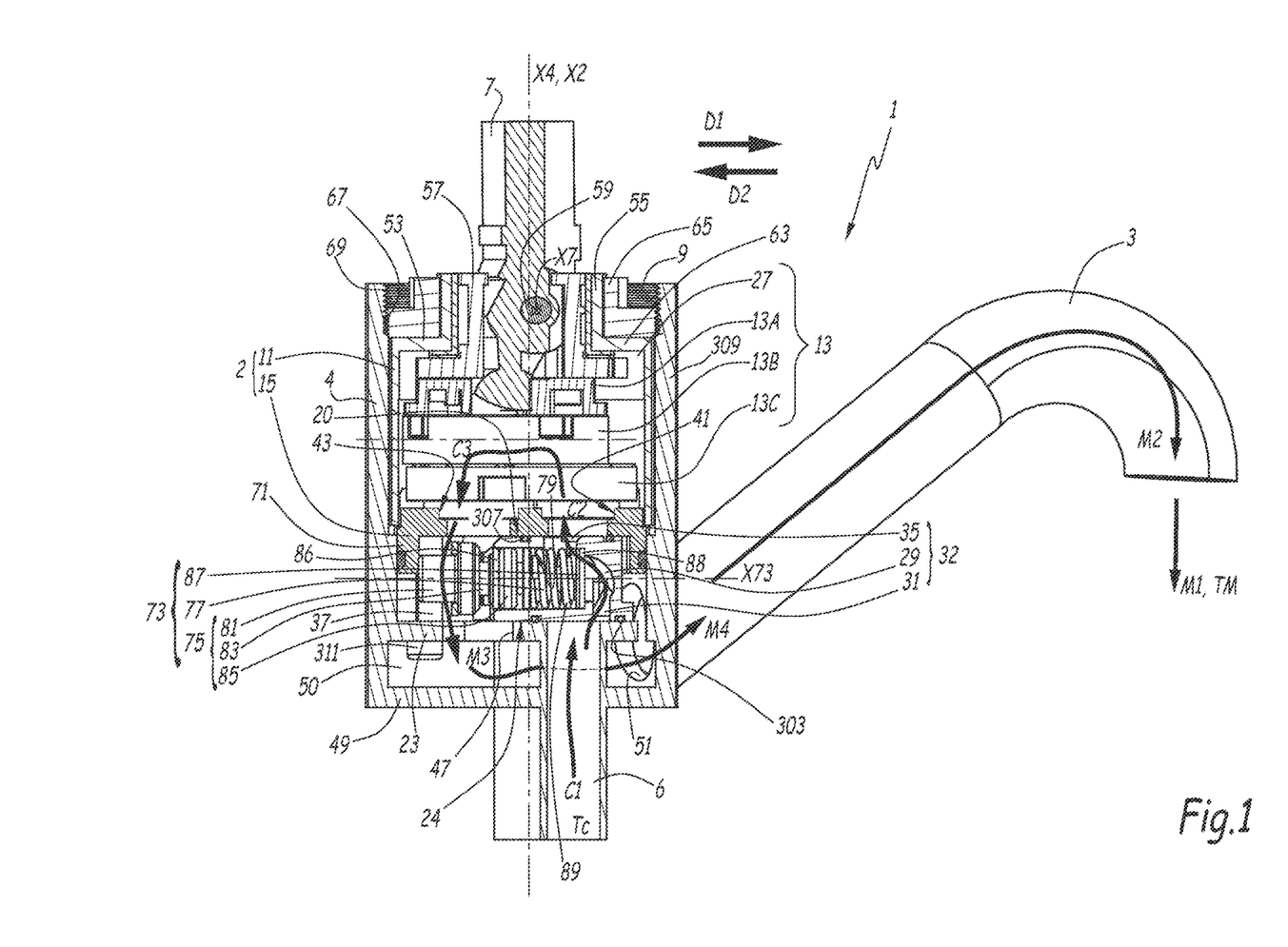
FIG. 1 shows a longitudinal section of a mixer tap comprising a mixing unit according to a first embodiment according to the invention.
Figure 2:
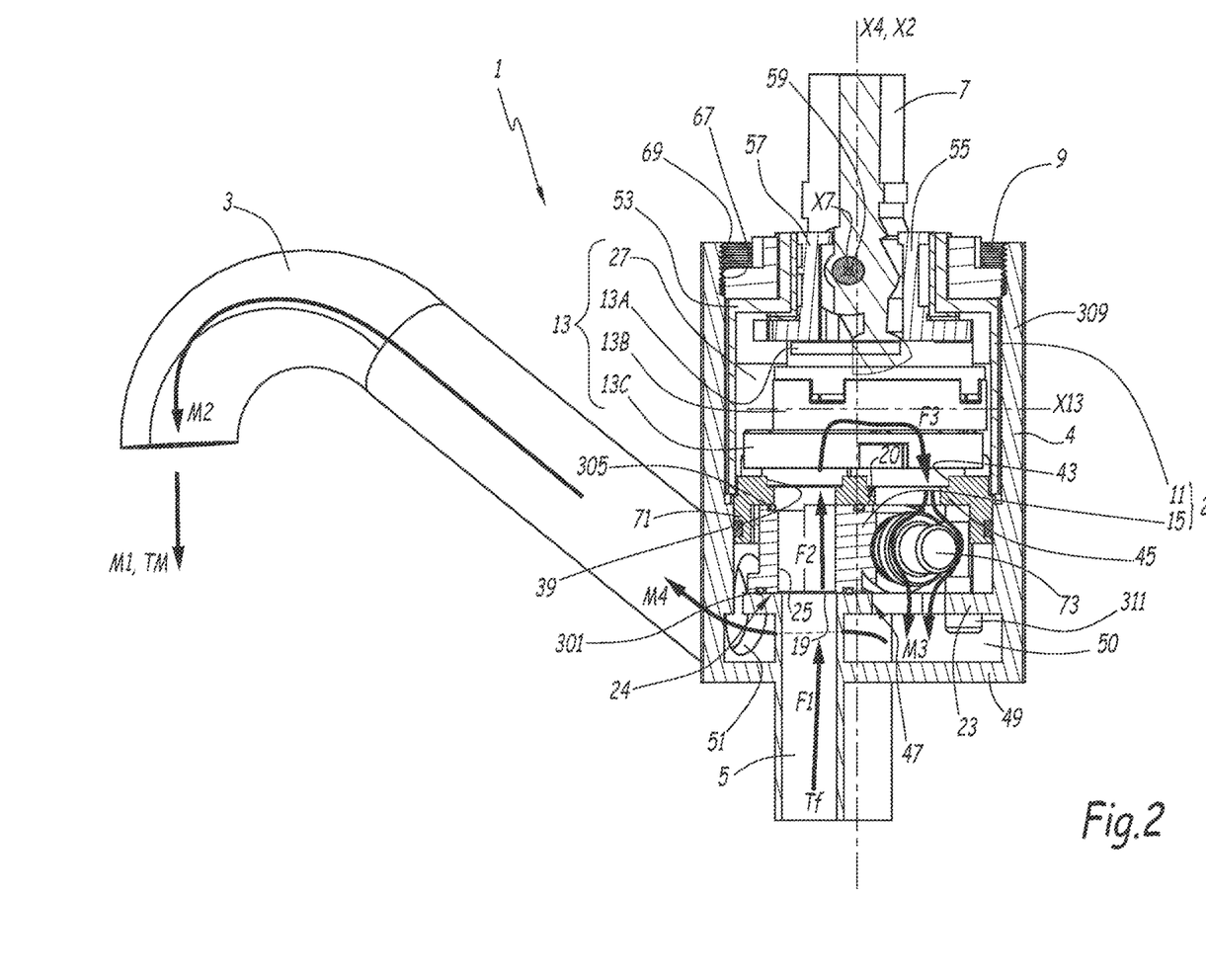
FIG. 2 shows a longitudinal section of the mixer tap of FIG. 1, according to another sectional plane.
Figure 3:
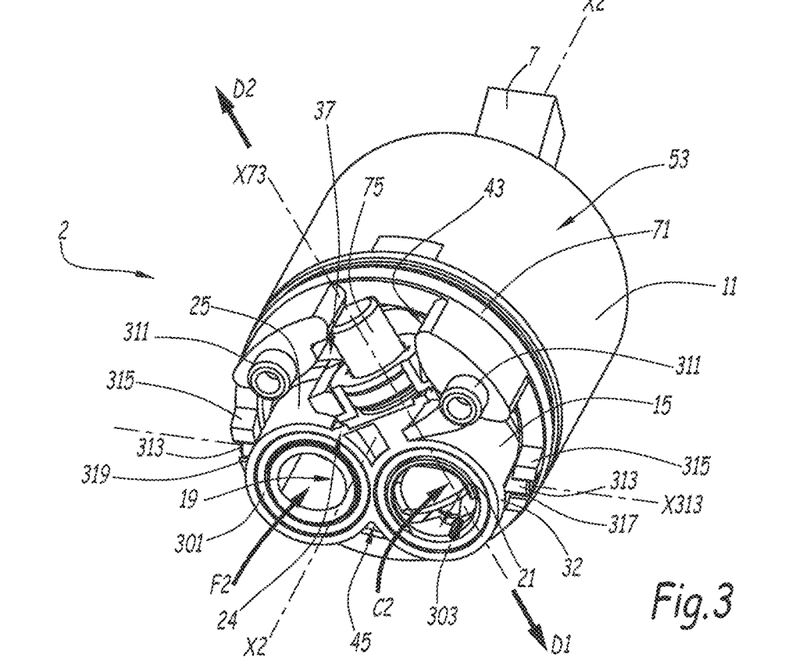
FIG. 3 shows a perspective view from below of the mixing unit of FIGS. 1 and 2.

FIGS. 1 and 2 illustrate a mixer tap 1 in which is inserted a mixing unit 2 shown alone in FIG. 3. The mixer tap 1 is preferably designed to be installed on a tray type sink, or more generally within a sanitary installation. The mixer tap 1 comprises, in a conventional manner, a spout 3 from which a mixed flow of water illustrated by the arrow M1 is intended to issue. The tap 1 also comprises a reception body 4 comprising an annular wall 309 defining a body axis X4 which is intended to be arranged vertically when the tap is mounted on the sanitary installation. The mixing unit 2, for its part, has a general cylindrical shape with a circular base that defines a coaxial axis of the cartridge X2, and is complementary in shape to the annular wall 309 in order to be received therein, by sliding it along the body axis X4, so that, as shown in FIGS. 1 and 2, the axes X2 and X4 merge. The mixing unit 2 is inserted into the body 4 via an upper opening 9 of the wall 309 along the cartridge axis X2.

For convenience, the remainder of the description is oriented with respect to the axis X2, wherein the terms "upper" and "top" relate to an axial direction turned towards the upper part of FIG. 1, while the terms "lower" and "bottom" relate to an opposite axial direction.

The spout 3 forms a curved conduit extending upwards from the wall 309 obliquely to the cartridge axis X2, wherein the curvature of the spout 3 guides the flow of mixed water M1 downwards. The mixed flow of water thus progresses obliquely upwards in the spout along the arrow M2 to the free end of the latter.

The mixer tap 1 also comprises a cold water inlet 5 which is visible in FIG. 2, and a hot water inlet 6 which is visible in FIG. 1, and which are connected to the body 4 at a bottom end of the body 4. The cold water inlet 5 and the hot water inlet 6 are intended to be connected to the conventional water supply means of the sanitary installation that are not detailed in the present description. The cold water progresses upwards in the inlet 5 according to the arrow F1, at a temperature Tf. The hot water progresses upwards in the inlet 6 according to the arrow C1, at a temperature Tc. The flows C1 and F1 are mixed within the mixer tap 1 to form the flow M1, at a temperature TM between Tf and Tc, and the added flows C1 and F1. In this case, the mixing of the incoming flows F1 and C1 to form the outflow M1 is carried out in the mixing unit 2.

Figure 4:
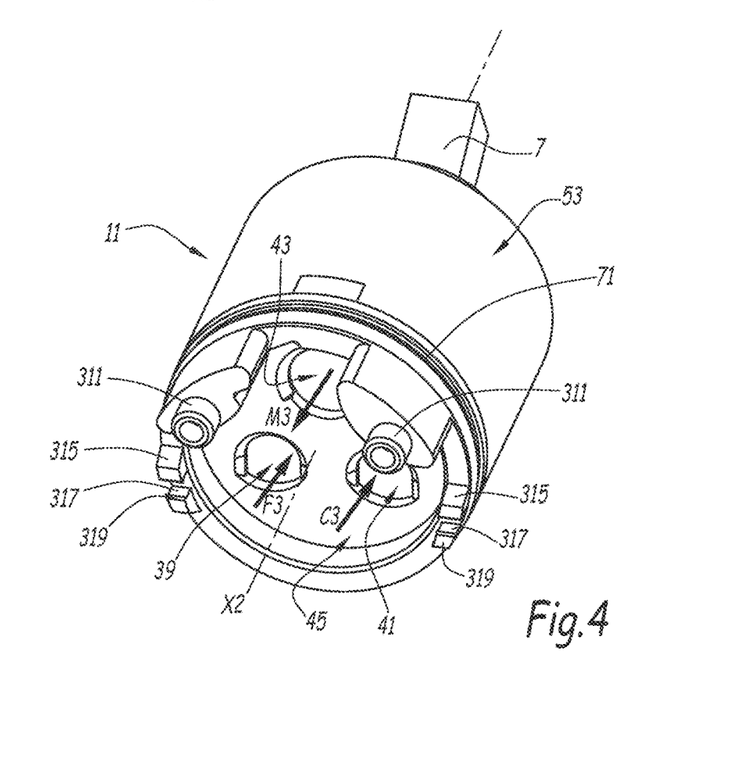
FIG. 4 shows a view similar to FIG. 3, in which an additional housing of the mixing unit is omitted.
Figure 5:
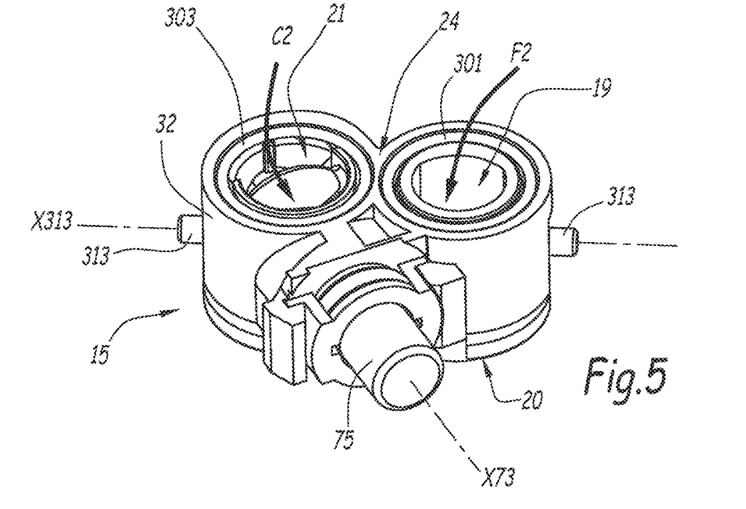
FIG. 5 shows a perspective view of the additional housing omitted in FIG. 4.

The mixing unit 2 comprises, on the one hand, a cartridge 11 shown separately in FIG. 4 and, on the other hand, an additional housing 15, shown separately in FIG. 5. The housing 15 is designed to be mounted in support towards the top against a coupling base 45 which ends at the bottom of the cartridge 11 along the cartridge axis X2, which corresponds to a so-called coupling position of the additional housing 15 with the coupling base 45, as illustrated in FIG. 1 to 3. In this case, the coupling base 45 has a general discoidal shape centered on the cartridge axis X2. The housing 15 and the cartridge 11 are also designed to be decoupled from each other, and thus handled separately.

When mounted within the body 4, the cartridge 11 is located in the upper part thereof, above the additional housing 15 which is located in the lower part of the body 4. In order for the tap 1 to operate, it is provided that the cartridge 11 and the additional housing 15 are in the coupling position and mounted within the body 4 as shown in FIGS. 1 and 2. In this case, the additional housing 15 comprises a first side 20 intended to come into axial support against a coupling base 45, and a second side 24, opposite and parallel to the first side 20, through which it bears down axially against the coupling plate 23 of the body 4. This latter is substantially discoidal and extends radially with respect to the cartridge axis X2 and is integrally arranged within the annular wall 309. The cartridge 11 comprises a cover 53 enclosing mixing means 13, described hereinafter, and forms a cylindrical outer envelope with a circular base around the cartridge axis X2, so that the cartridge 11 is itself of generally cylindrical shape.

As is particularly visible in FIG. 5, the additional housing 15 comprises two pins 313, which protrude outwards from the housing 15 in opposite directions along a pin axis X313 which is parallel to the sides 20 and 24, and which is intended to be orthogonal to the axes X2 and X4. In this case, the pins 313 each protrude from the outer surface of one of the conduits 25 and 32. The pins 313 are, for example, of general cylindrical shape with a circular base that is coaxial with the axis X313. Furthermore, two clamps 315 that are particularly visible in FIG. 4, protrude downwards from the coupling base 45 parallel to the cartridge axis X2, wherein each has a notch 317 oriented parallel to the axis X2 and open downwards. Each of the clamps 315 is provided and positioned to receive, within the notch 317 in question, one of the two pins 313 as illustrated in FIG. 3. In practice, the notches are also aligned on a notch axis that is orthogonal to the axis X2, and which becomes parallel to the axis X313 when the pins 313 are inserted into the notches 317.

Each of the notches 317 comprises an end collar 319, which forms a pair of claws designed to retain the pin 313 within the notch 317, between the bottom of the notch and the end collar 319. In fact, the width of each notch 317 is substantially constant from the bottom of the notch 317 to the neck 319, which constitutes an end narrowing of the notch. The pin 313 may be caught in the notch 317 by moving the neck 319 towards the bottom of the latter, which causes a temporary local deformation of the neck 319. Once caught, the pin 313 may move freely between the bottom and the neck 319 along a path parallel to the axis X2, and orthogonal to the axis X313, while still being retained by the neck 319. As the two pins are caught in the slot, it is said that the housing 15 is in the attachment configuration with the cartridge 11, between:
- on the one hand a remote position, in which the pins 313 are caught within their respective slot 317 and abut against the associated end neck 319, wherein this separated position corresponds to a position in which the housing 15 is the furthest away axially from the cartridge 11 while being in the attachment configuration, and
- on the other hand, the coupling position corresponds to an intermediate position of the pins 313 between the end necks 319 and the bottom of the notches 317.

To release the pin 313 from the neck 319, it is necessary to pull the housing 15 away from the cartridge 11 and locally and temporarily deform the neck 319 to pass the pin 313 past the neck 319 thus deformed. When the two pins 313 are released from their notch 317, it is said that the housing 15 is in a detached configuration of the cartridge 11.

The pins 313 and the clamps 315 thus form means for attaching the housing 15 to the coupling base 45 of the cartridge 11. In the attachment configuration, the housing 15 is positioned, at least approximately, radially with respect to the housing. X2 cartridge axis while "floating" axially. The movement of the housing 15 is therefore carried out in a direction of travel substantially parallel to the axis X2, between two end positions delimited by the end necks 319, on the one hand, and the bringing into contact of the first face 20 with the surface of the coupling base 45. These two end positions define the maximum positions between which the movement takes place.

In the attachment configuration, it is said that the attachment means are in a "loaded" state. In this case, the attachment means are loaded to the extent that the pins 313 interact with the clamps 315 to retain the housing 15 attached to the cartridge 11. In fact, the pins 313 are supported on the neck 319 when an attempt is made to move the housing 15 away from the cartridge 11 in the attachment configuration and are thus mechanically loaded.

Similarly, if one tries to move the housing 15 radially relative to the cartridge 11, the notches 312 are mechanically loaded laterally.

Thus, by virtue of the attachment means described above, the housing 15 may be secured to the cartridge 11 temporarily, which facilitates the mounting of the unit 2 within the body 4 to the extent that the unit 2 may be mounted in one piece. When the housing 15 is placed in the separated position, these attachment means, and in particular the clamps 315, retain the housing 15 in the attachment configuration, by means of the pins 313.

The sliding of the mixing unit 2 in the body 4 is thus effected by means of the cover 53 sliding inside the wall 309, so that rotation of the unit 2 about the axis X4 is possible. In order to be able to easily position the unit 2 about the axis X4, two positioning pins 311 protrude from the coupling base 45 downwards and parallel to the axis X2 in order to extend beyond the second side 24 of the housing 15. The pins 311 are distributed around the axis X2, and are intended to be introduced into corresponding positioning holes (not shown) formed through the coupling plate 23, in order to form a system for positioning in rotation about the axis X4 of the unit 2. The pins 311 allow the positioning of both the housing 15 and the cartridge 11 when they are in the attachment configuration. To facilitate assembly, the pins 311 are shaped to slide within the positioning holes of the coupling plate 23 so as not to hinder the axial displacement of the unit 2 in the body 4.

The mixing unit 2 may be introduced in one piece by axial sliding along the axis X4 in the body 4 until it abuts against the coupling plate 23.

The cover 53 comprises a shoulder 63 near its upper end, by means of which a nut 65, centered on the cartridge axis X2, makes it possible to press the mixing unit 2 against the coupling plate 23. In practice, the nut 65 has an external thread 67 which is screwed onto an internal thread 69 of the upper opening 9 of the body 4, while these threads 67 and 69 are centered on the cartridge axis X2. The nut 65 and the threads 67 and 69 thus form means for clamping the mixing unit 2 against the coupling plate 23 along the body axis. The tightening of the nut 65 allows, on the one hand, coupling of the housing 15 with the coupling base 45, and, on the other hand, coupling of the housing 15 with the plate 23.

In summary, in order to manufacture the mixer tap 1, the additional housing 15 is first placed in the attachment configuration in the separated position. The mixing unit 2, thus formed, is then slid into the receiving body 4 until the housing 15 comes into axial abutment against the coupling plate 45. Then, finally, the mixing unit 2 is tightened against the coupling plate 45 by the nut 65, which has the effect of moving the housing 15 from its separated position to the coupling position with the coupling base, while also coupling the second side 24 of the housing 15 with the coupling plate 23.

When the unit 2 is clamped between the nut 65 and the coupling plate 23, each of the pins 313 is in an intermediate position between the bottom of the notch 317 and the end collar 319, i.e. the pins 313 are spaced from the neck 319, so that the attachment means are no longer loaded, and the holding of the housing 15 with the cartridge 11 within the body 4 in the coupling position is mainly, even totally, provided by tightening the nut 65.

The operation of the tap 1 and, in particular, of the mixing unit 2 described below corresponds to an operation in the case where the mixing unit 2 is in the coupling position within the body 4, under the pressure of the nut 65.

The inlets 5 and 6 of the inflows F1 and C1 pass through the coupling plate 23 to supply the additional housing 15 via the second side 24. The inlets 5 and 6 are respectively connected, in a leaktight manner, to a first inlet 19 of the first inflow F1, and a second inlet 21 of the second inflow C1 opening at the surface of the second side 24. This sealing is provided by a first lower seal 301, which is arranged at the first inlet 19 at the surface of the side 24, and by a second lower seal 303 arranged at the second inlet 21, at the surface of the side 24. When the mixing unit 2 is mounted within the body 4, the seals 301 and 303 are compressed under the pressure of the nut 65 between the side 24 and the coupling plate 23 to ensure sealing between the inlets 5 and 6 and the inlets 19 and 21 respectively. It is to be understood that the insertion of the positioning pins 311 in the coupling plate 23 makes it possible to position the inlets 19 and 21 with respect to the inlets 5 and 6 respectively, in order to ensure their good connection.

As illustrated in FIG. 2, the first inflow progresses along the arrow F1 to the first inlet 19 and continues its travel through the additional housing 15 from the bottom to the top along the arrow F2 in a first conduit 25 which traverses the housing 15 from the side 24 to the side 20 and extends parallel to the cartridge axis X2 from the first inlet 19. The conduit 25 guides the first inflow F2 to a mixing chamber 27 of the cartridge 11.

As may be seen in FIGS. 1 and 2, the cartridge 11 contains the means 13 for mixing the first inflow F1 and the second inflow C1 in order to obtain the outflow M1, wherein the mixing means 13 include the mixing chamber 27 as shown in FIG. 1, and wherein the second inflow enters the additional housing 15 via the second inlet 21, and flows from the bottom to the top along the arrow C2 through the additional housing 15 in a second conduit, in this case a baffle conduit 32, which generally extends from the bottom upwards from the second inlet 21 from the side 24 to the side 20. In this case the baffle conduit 32 comprises a first portion 31 parallel to the cartridge axis X2 and extending from the second inlet 21. The baffle conduit 32 then comprises a portion 29 that may be closed by a shutter 33 which is described in more detail below, wherein the closable portion 29 extends the first portion 31. Finally, the baffle conduit 32 comprises a third portion 35 parallel to the cartridge axis X2 leading the second inflow C2 to the cartridge 11 when it is in the coupling position with the housing 15. The third portion 35 extends the closable portion 29 which extends orthogonally with respect to the first portion 31 and the third portion 35, so that the baffle conduit 32 forms an "S". The third portion 35 opens into the mixing chamber 27 via the side 20 when it is in the coupling position.

The mixing chamber 27 comprises a first inlet 39 for the first flow F1, a second inlet 41 for the second flow C1, and an outlet 43 for the outflow M1. The inlets 39, 41 and the outlet 43 open on the surface of the coupling base 45 of the cartridge 11. The inlets 39 and 41 and the outlet 43 are distributed around the cartridge axis X2.

Thus, in summary, the conduits 25 and 32 are respectively connected to the inlets 39 and 41 at the first side 20 when the housing 15 is in the coupling position with the coupling base 45 of the cartridge 11. It is to be understood that in the attachment configuration, the conduits 25 and 32 are already positioned opposite the inlets 39 and 41 respectively, and are thus prepared for connection of these elements together by tightening the nut 65.

The two inflows F2 and C2 enter into the mixing chamber 27 of the cartridge 11 in order to be mixed and form the outflows M1 and M2.

As illustrated in FIGS. 1 and 2, in order to guarantee the tightness of the connection between the inlets 39 and 41 with, respectively, the conduits 25 and 32, the housing 15 is provided with two intermediate seals 305 and 307, for example toric or flat, which are interposed between the additional housing 15 and the coupling base 45. In this case, the seal 305 surrounds the conduit 25 while the seal 307 surrounds the conduit 32 at the surface of the first side 20, and so ensures the seal between the conduit 25 and the inlet 39 and between the conduit 32 and the inlet 41. When the housing 15 is in the attachment configuration with the cartridge 11, in the separated position, the seals 305 and 307 are preferably not supported, or only slightly supported, against the cartridge 11. Under compression, the nut 65 and the coupling plate 23 between which the mixing unit 2 and the seals 305 and 307 are crushed, so that the coupling of the cartridge 11 with the housing 15 is sealed. Alternatively, the seals 305 and 307 may also be arranged on the coupling base 45. Additional seals may also be provided and interposed between the cartridge 11 and the housing 15.

In the example illustrated, the mixing means 13 comprise a set of mixing disks 13A, 13B and 13C, which are contained in the mixing chamber 27. The mixing disks 13A, 13B and 13C are in surface contact with each other and extend in planes orthogonal to the cartridge axis X2. The set of mixing disks comprises an upper disk 13A, an intermediate disk 13B and a lower disk 13C, wherein the upper disk 13A and intermediate disk 13B are movable relative to the disk 13C, which is fixed, and wherein the intermediate disk 13B is in sliding contact and sealed with the 13C disk. The intermediate disk 13B and lower disk 13C comprise a system of channels and holes (not shown) connected to the inlets 39 and 41 and the outlet 43 and which, depending on the relative position of the disks 13B and 13C, regulate the respective flow rate of the inflows F2 and C2 entering the set of disks via the inlets 39 and 41. As represented by the arrows F3 and C3, the inflows circulate in the system of channels and holes and first pass through the lower disk 13C, then into the intermediate disk 13B where they are brought into contact and mixed in order to form the outflow M3. The outflow M3 is at temperature TM, wherein the ratio of the flow rates of the inflows F3 and C3 make it possible to adjust the temperature TM, while the value of the flow rates of the inflows F3 and C3 make it possible to adjust the flow rate of the outflow M1. The inflows F3 and C3 then flow again through the lower disk 13C from top to bottom. In practice, the passage section of the inflows F3 and C3 varies as a function of the relative position of the disks 13B and 13C, by placing the aforementioned channels and holes in communication. Ceramic disks and their channel system are not described in more detail because they constitute well-known mixing means as such, and are described, for example, in FR-B1-2 876 433. It is also to be understood that, if it is preferred to use a ceramic disk mixing chamber, any known and conventionally-used mixing means may be used instead in mixer tap cartridges.

The outflow M3 formed by mixing within the mixing chamber 27 is then discharged from the latter and from the cartridge 11 into an outlet chamber 37 of the additional housing 15, leading the outflow M3 from top to bottom to an outlet 47 formed through the coupling plate 23.

It is to be understood that the outlet chamber 37, the through conduit 25 connected to the first inlet 19, and the closable portion 29 connected to the second inlet 21 are distributed around the cartridge axis X2. In the same manner, the inlets 5, 6 and the outlet 47 are distributed around the cartridge axis X2.

The outflow M3 is thus discharged into a low chamber 50 of the body 4 via the outlet 47. In practice, the cartridge 11 comprises a sealing ring 71 which is centered on the cartridge axis X2 and protrudes downwards from the coupling base 45 and extends around the additional housing 15, in order to be in sealing contact with the wall 309 of the body 4. The ring 71 extends from the circumference of the coupling base 45 to a free annular surface, from which the claws 315 and the pins 311 protrude by extending the ring 71 and preferably coming from the same material.

The mixer tap 1 also comprises a bottom 49 that is discoidal and orthogonal with respect to the cartridge axis X2, which closes the body 4 at the lower end of the wall 309. The low chamber 50 is thus delimited by the sealing ring 71, the wall 309, the bottom 49 and the coupling plate 23. The outflow M3 is led into the low chamber 50 along the arrow M4, then up to the spout 3 through an access opening 51 arranged radially in the wall 309 with respect to the cartridge axis X2, thus placing the low chamber 50 in communication with the spout 3.

The mixing unit 2 further comprises a lever 7 which is movably mounted at the top of the cover 53 of the cartridge 11, i.e. opposite the coupling base 45, in order to extend beyond the wall 309 through the upper opening 9 and allow a user to operate the lever 7. The manipulation of the lever 7 actuates the mixing means 13, and moves, in particular, the upper disk 13A and intermediate disk 13B in rotation about an axis parallel to the cartridge axis X2, or about the axis X2 itself, and in translation along an axis X13 which is orthogonal to the cartridge axis X2. In general, the lever 7 forms a control member for actuating at least one of the disks 13A, 13B and 13C, and thus controlling the respective flow rates of the first inflow F1 and the second inflow C1. Thus, the control member 7 makes it possible to adjust both the temperature and the flow rate of the outflow M1 by adjusting the relative position of the disks of the disk set 13A, 13B and 13C. The mixer tap 1 and the cartridge 11 may thus be described as "single-lever" insofar as the lever 7 makes it possible to control both the flow rate and the temperature of the outflow M1 by adjusting the flow rates of the inflows F1 and C1. In practice, the lever 7:

pivots about the cartridge axis X2, which causes the upper disks 13A and 13B to rotate about this same axis, in order to adjust the ratio between the flow rate of the first and second inflows F1 and C1 and thus the temperature outflow M1, and pivots about a second axis X7 orthogonal to the cartridge axis X2 in order to translate the upper disks 13A and 13B along the axis X13 and to vary the flow rate of the first and second flows equitably, in order to regulate the flow rate of the outflow.

The lever 7 is connected to the set of disks 13A, 13B and 13C, i.e. the mixing means 13, by an operating mechanism which is not described in more detail, insofar as it is well known in itself.

The cover 53 includes an upper neck 55 of cylindrical shape centered on the cartridge axis X2, and within which is mounted a rotary support 57 of the lever 7 to rotate about the cartridge axis X2. In practice, the upper neck 55 is arranged at the upper end of the cover 53, and extends the inside of the shoulder 63 upwards, so that the nut 65 is placed around the upper neck 55. The lever 7 traverses the rotary support 57 and is mounted on the latter by means of a pivot axle 59 of the lever 7 relative to the rotary support 57 about the axis X7. In this example, the set of disks 13A, 13B and 13C is mounted between the coupling base 45 and the lever 7, and in this case between the coupling base 45 and the rotary support 57. The coupling base 45, the rotary support 57 and the cover 53 thus define the mixing chamber 27.

The mixing unit 2 also comprises thermostatic means contained in the housing 15, and particularly visible in FIG. 1. They comprise in the first place, a thermostatic element 73 extending along a first axis X73 included in the drawing of FIG. 1, and extending perpendicularly to the cartridge axis X2. In particular, the closable portion 29 of the baffle conduit 32 extends coaxially with the first axis X73. Along this first axis X73, the thermostatic element 73 includes a thermosensitive portion 75 mounted in a housing 79 of the additional housing 15. The housing 79 is a conduit that is coaxial with the first axis X73, and is formed in the additional housing 15 in order to connect the outlet chamber 37 and the baffle conduit 32. In practice, the housing 79 thus communicates the outlet 47 with the second inlet 21.

The thermosensitive portion 75 forms a fixed part of the thermostatic element 73 and comprises, in particular, along the first axis X73, a cup 81 which protrudes from the housing 79 and which extends in the passage of the outflow M3 at the outlet 47. The cup 81 has a generally cylindrical shape with a circular base centered on the first axis X73, and encloses a heat-expandable body which is, for example, a suitable wax. As the cup 81 is in contact with the outflow M3, the wax expands and contracts as a function of the temperature TM of the outflow M3.

The thermosensitive portion 75 also comprises a guide 83, which extends the cup 81 along the first axis X73, and by means of which the thermosensitive portion 75 is mounted in the housing 79. The guide 83 has a circular shape about the first X73 axis and extends within the housing 79. The guide 83 closes the housing 79 in a sealed manner in order to prevent any substantial transfer of water from the second flow C2 entering the outlet 47. In practice, the guide 83 is provided with a circumferential seal 85, centered on the first axis X73, and by means of which the thermosensitive portion is mounted in the housing 79. The seal 85 ensures the sealing of the closure of the housing 79 by the thermosensitive part 75. A collar 86 is provided around the guide 83, wherein the seal bears axially against which collar 86, and wherein the collar is arranged on the side of the cup 81a in order to retain the seal 85 in axial translation towards the cup 81. The thermostatic element 73 is thus housed in the housing 79 in order to seal off communication between the outlet 47 and the second inlet 21.

The thermostatic element 73 also comprises a movable portion 77, which forms a cylindrical piston coaxial with the first axis X73. The movable portion 77 is mounted within the guide 83, in order to move relative to the thermosensitive portion 75 away from the thermosensitive portion 75, towards the baffle conduit 32, along the first axis X73 under the action of the thermo-expandable body contained in the cup 81.

A shutter 87, belonging to the above-mentioned thermostatic means, is provided within the closable portion 29, and is designed to be displaced along the first axis X73 by the movable portion 77. The shutter 87 is arranged with respect to the movable portion 77 so that the latter may push the shutter 87 to a position that closes the second inlet 21. In this case, the movable portion 77 is in contact with the shutter 87 in order to push the latter away from the thermosensitive portion 75 in a direction D1 parallel to the axis X73, under the action of the thermo-expandable body contained in the cup 81.

In practice, the shutter 87 is mounted in compression between the free end of the movable portion 77 and a return spring 89. The latter is itself mounted in compression between the shutter 87 and an internal shoulder of the closable portion 29. A collar 88 centered on the first axis X73 is interposed between the return spring 89 and the inner shoulder. The return spring 89 is therefore a compression spring that is designed to return the shutter 87 to an open position of the baffle conduit 32 and thus the second inlet 21 in a direction opposite to D1.

The shutter 87 thus closes the closable portion 29, and thus the second inlet 21, according to a variable degree of closure as a function of the expansion of the heat-expandable body and therefore of the temperature TM, in order to vary the flow rate of the second flow entering C2 as a result.

When the temperature TM reaches a predetermined threshold for example 50° C., the flow C2 is totally, or at least partially, interrupted by closing the second inlet 21.

In summary, when the housing 15 is in the coupling position, its thermostatic means are designed to change the flow rate of the second inflow C2 as a function of the temperature of the outflow M3. In a variant not illustrated, the thermostatic means of the housing 15 are provided to modify also, or alternatively, the flow rate of the first inflow F2 as a function of the temperature of the outflow M3. In this case, for example, means are provided to close the first inlet 39, such as a shutter that is controlled and driven by a thermostatic element that is sensitive to the temperature of the outflow M3 in the outlet 43.

Figure 6:
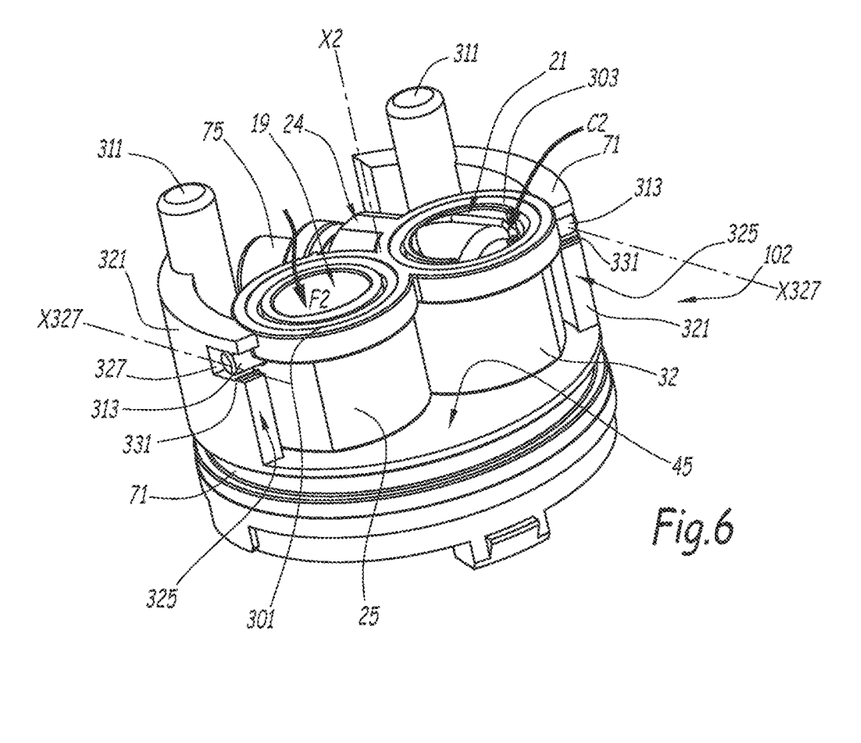
FIG. 6 shows a partial perspective view of a mixing unit according to a second embodiment according to the invention.
Figure 7:
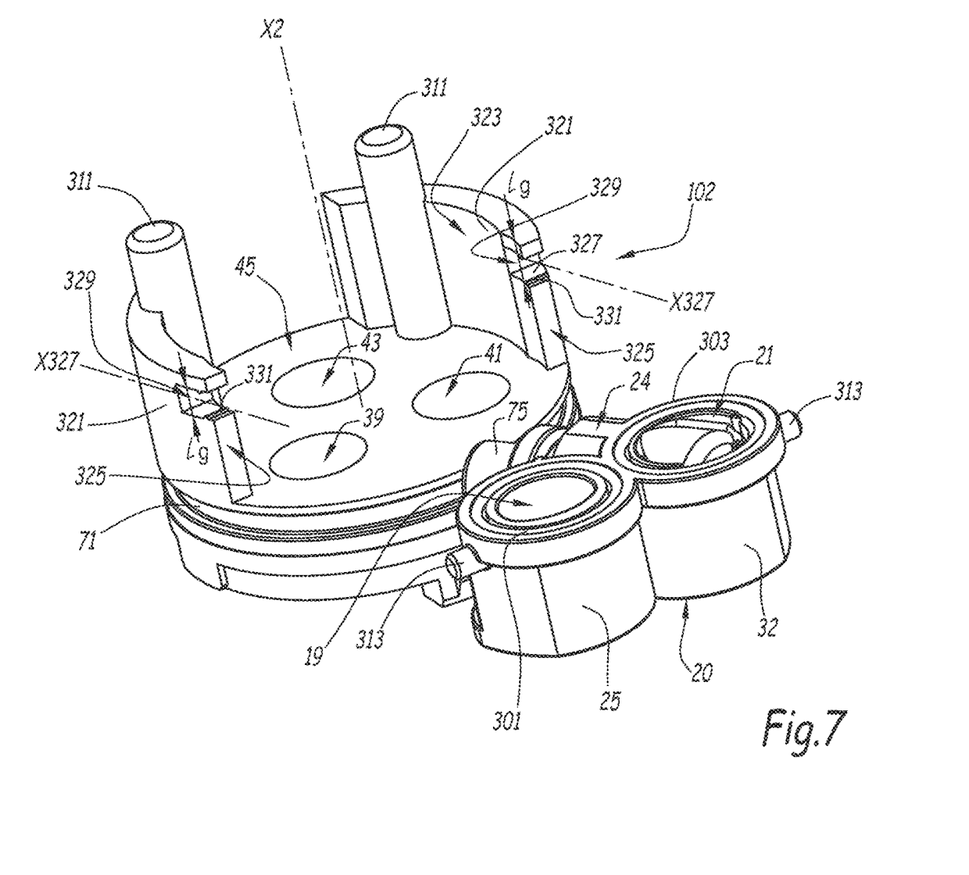
FIG. 7 shows an exploded perspective view of the mixing unit of FIG. 6.

A mixing unit 102 according to the second embodiment of the invention shown in FIGS. 6 and 7 is described below. This unit 102 has similar characteristics to the mixing unit 2 illustrated in FIG. 1 to 5 of the first embodiment described above. The following description is therefore centered on the differences between the first and second embodiments. In particular, the reference numbers common to FIG. 1 to 5 and FIGS. 6 and 7 refer to the same features and objects which have been described above for the first embodiment.

The mixing unit 102 comprises a cartridge, of which only a lower portion including the coupling base 45 is shown. The unrepresented elements of the cartridge of the unit 102 are similar to those of the unit 2 of the first embodiment described above. For this mixing unit 102, the coupling base 45 is provided with a first inlet 39, a second inlet 41 and an outlet 43, for the inflows F2 and C2 and outlet M3 as described above. The mixing unit 102 also comprises an additional housing 15, with a baffle conduit 32, a through conduit 25, and a thermostatic element including a thermosensitive portion 75.

The housing 15 of the unit 102 also includes pins 313 as described above.

From the sealing ring 71 two walls 321, each forming only a portion of a ring centered on the axis X2, protrude from the coupling base 45. The walls 321 thus extend the cover (not shown) of the cartridge 11, but in a manner similar to that of FIG. 1 to 5. The pins 311 protrude from the coupling base 45 along an inner face 323 of the walls 321 parallel to the axis X2. The walls 321 each have at least one rectilinear lateral edge 325, which extends parallel to the axis X2. The edges 325 thus delimit an open portion between them, through which the housing 15 may be inserted in a direction orthogonal to the axis X2, as illustrated in FIG. 7. A slide 327 is provided in each of the walls 321, from each of the associated edges 325, as far as a bottom 329. Each of the slides 327 is shaped to receive within it one of the pins 313, wherein each pin 313 is inserted into the corresponding slide 327 along a sliding axis X327 that is orthogonal to the axis X2, as shown in FIG. 6. Each slide 327 has, in the vicinity of the edge 325, an end collar 331, which forms a pair of claws to retain the pin 313 concerned within the slide 327, between the bottom 329 and the neck 331. The distance between the bottom 329 and the neck 331 links the pin 313 with the slide 327 along the axis of X327, without deflection, or, if not, with a slight clearance. Once the pins 313 are positioned in their respective slide 327 in addition to the neck 331, the housing 15 is in an attachment configuration with the coupling base 45, wherein it is thus connected transversely with the coupling base 45 with respect to the axis X2. On the other hand, each slide 327 has a width Lg, measured parallel to the axis X2, which is greater than the diameter of the pins 313, so that the latter may move within the notch parallel to the axis X2.

Thus, for this second embodiment, a slide system, including in this example the slides 327 secured to the coupling base 45 and the pins 313 secured to the housing 15, forms attachment means for arranging the attachment configuration of the housing 15 by engaging the slide system, i.e. by inserting each of the pins 313 in one of the slides 327. This engagement, performed along the slide axis X327, allows the movement of the housing 15 with respect to the coupling base 45 parallel to the cartridge axis X2, between two positions, i.e.:

- a separated position of the housing 15 with respect to the coupling base 45 in which each pin 313 abuts against one of the edges of the associated slide 327,
- an opposite coupling position, in which each pin 313 is in an intermediate position between the two edges of the associated slide 327.

A mixing unit 202 according to the third embodiment of the invention shown in FIG. 8 to 11 is described below.

This unit 202 has similar characteristics to the mixing units 2 and 102 illustrated in FIG. 1 to 7. The following description therefore focuses on the differences between this third embodiment of FIG. 8 to 11 and the embodiments of FIG. 1 to 7. In particular, the reference numerals common to FIG. 8 to 11 and to FIG. 1 to 7 refer to the same features and objects which have been described above for the first and second embodiments.

The mixing unit 202 comprises, in particular, a cartridge 11 with a coupling base 45 having a first inlet 39, a second inlet 41 and an outlet 43 for the inflows F2 and C2 and the outlet M3 such as that described above. The mixing unit 202 also comprises an additional housing 15 with a baffle conduit 32, a through conduit 25 and a thermostatic element 73 including a thermosensitive portion.

From the sealing ring 71 of the cartridge 11, two walls 321 protrude from the coupling base 45 parallel to the cartridge axis X2, on either side of the cartridge axis X2. The walls 321 are arranged at the periphery of the coupling base 45 in the extension of the cover 53. Two positioning pins 311 protrude from the coupling base 45 downwards parallel to the axis X2, in order to extend beyond the walls 321, while each following one of the walls 321. Thus, each pin 311 extends between the wall 321 and the axis X2, at least in part. Each wall 321 ends with a surface 321A of the cartridge 11 bearing against the coupling plate 23 of the body 4 of the tap 1. The surfaces 321A extend in a plane which is orthogonal to the axis X2. As for the other embodiments, the pins 311 are distributed around the axis X2 in order to be introduced into the corresponding positioning holes (not shown) formed through the coupling plate 23, in order to form a system for rotating the unit 2 about the axis X4. Furthermore, a parapet 421 protrudes from the coupling base 45 parallel to the axis X2, so that the walls 321 and the parapet 421 are distributed in a regular manner in a triangle around the axis X2. The parapet 421 ends in a surface 421A which is located in the same plane as the surfaces 321A, so that the walls 321 and the parapet 421 together form support means for the cartridge 11 against the coupling plate 23 along the X4 axis. The additional housing 15, in the attachment configuration, is positioned between the walls 321 and the parapet 421, and is guided in translation along the axis X2 by the latter. In fact, the peripheral shape of the additional housing 15 corresponds to the shape of the walls 321 and the parapet 421, so that the housing 15 slides along the latter parallel to the axis X2 relative to the cartridge 11. It is to be understood that the distance between the first side 20 and the second side 24 of the additional housing 15 is less than the distance between the plane of extension of the surfaces 321A and 421A of the coupling base 45. Thus, when the unit 202 is mounted within the body 4 of the tap 1, the surfaces 321A and 421A bear against the coupling plate 23, wherein the additional housing 15 also bears against the coupling plate 23 via the seals 301 and 303 and against the coupling base 45 via the seals 305 and 307, wherein the seals 301, 303, 305 and 307 are crushed, so that the additional housing 15 is held in position along the axis X4 in an elastic manner by the seals 301, 303, 305 and 307.

Furthermore, the inner surfaces 71B of the coupling base 45 and the parapet 421 serve as positioning means of the additional housing 15 rotated relative to the cartridge 11 about the cartridge axis X2. In practice, the additional housing 15 comprises, at its periphery, two surfaces 426 of the additional housing 15 bearing against the corresponding inner faces 71B, which protrude from the coupling base 45, inside the sealing ring 71, extending in a plane parallel to the axis X2. The inner faces 71B are turned towards the axis X2. The additional housing 15 also comprises a recessed portion 423, which is formed in the peripheral surface of the additional housing 15 between the conduit 25 and the conduit 32. This recessed portion 423 is shaped to interact with the sliding surfaces 421B of the parapet 421, wherein these sliding surfaces extend in separate planes that are both parallel to the axis X2. The parapet 421 thus has a general V-shaped cross-section in a plane orthogonal to the axis X2, wherein the recessed portion 423 has a corresponding shape in order to slide along the surfaces 421B. In general, it is to be understood that the shape of the peripheral surface of the additional housing 15 and the protruding positioning elements of the coupling base 45 interact with one another in order to allow correct positioning of the additional housing 15 around the axis X2 of the cartridge 11, and thus around the axis X4 of the tap 1 when the unit 202 is mounted within this tap 1.

The mixing unit 202 also comprises means for attaching the additional housing 15 to the cartridge 11, which differ from the attachment means of the mixing units 2 and 102 described above.

Figure 8:
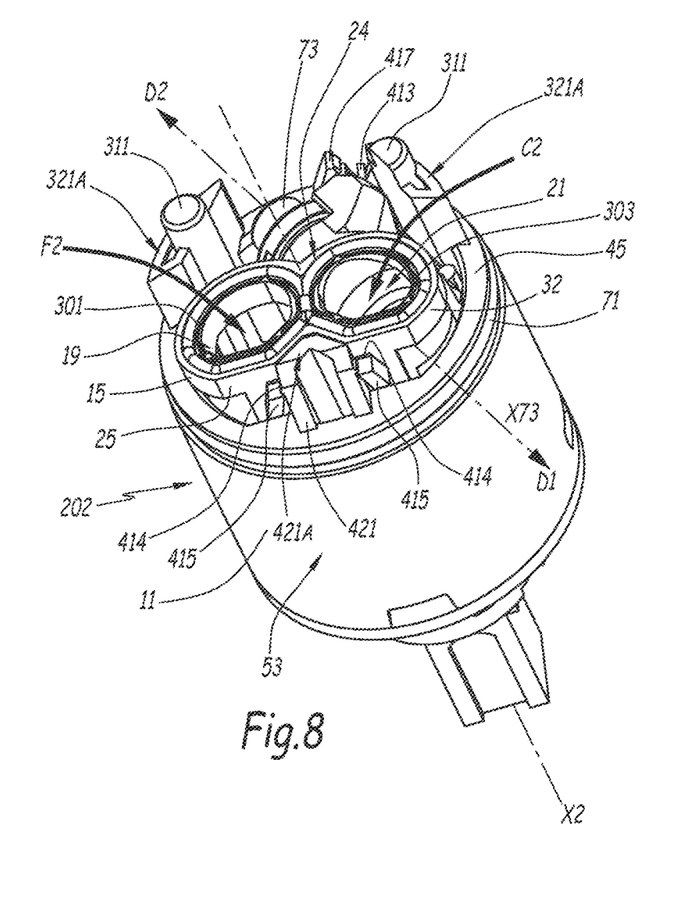
FIGS. 8 and 9 show perspective views from below, in two different orientations, of a mixing unit according to a third embodiment according to the invention.
Figure 9:
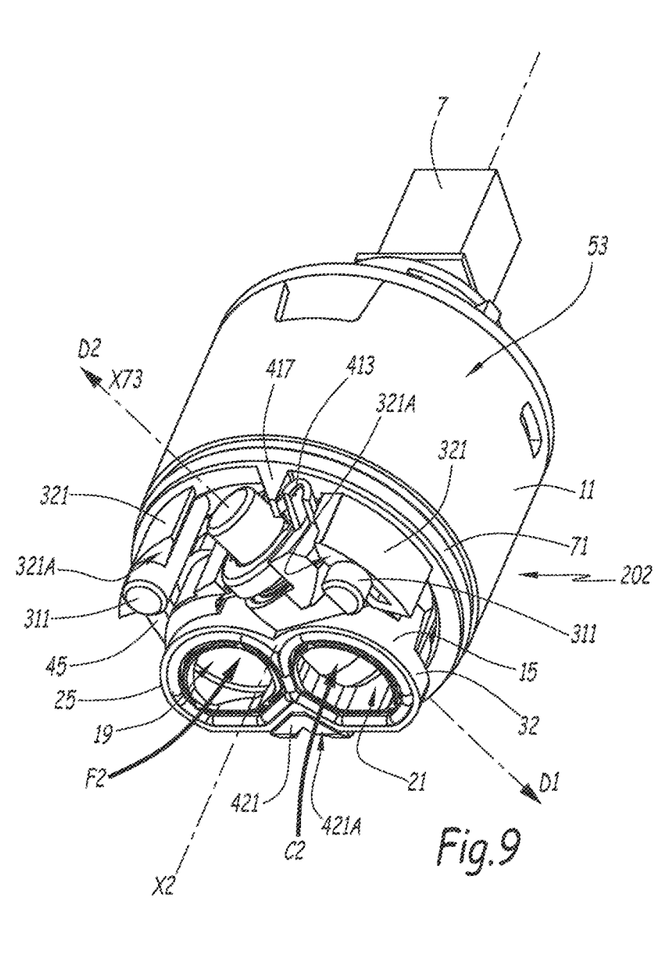
Figure 10:
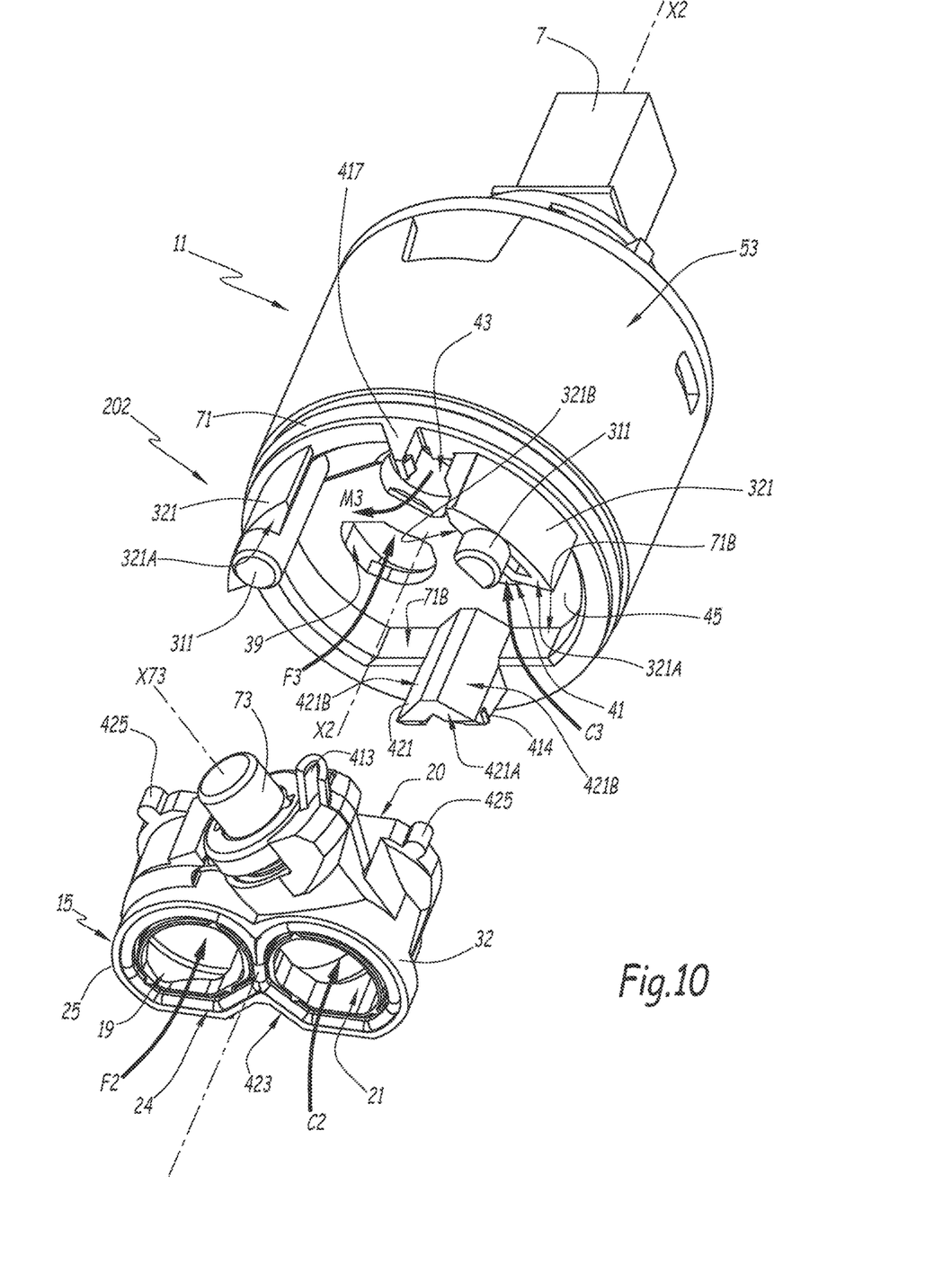
FIG. 10 shows an exploded perspective view, oriented like FIG. 9, of the mixing unit of FIG. 9.
Figure 11:
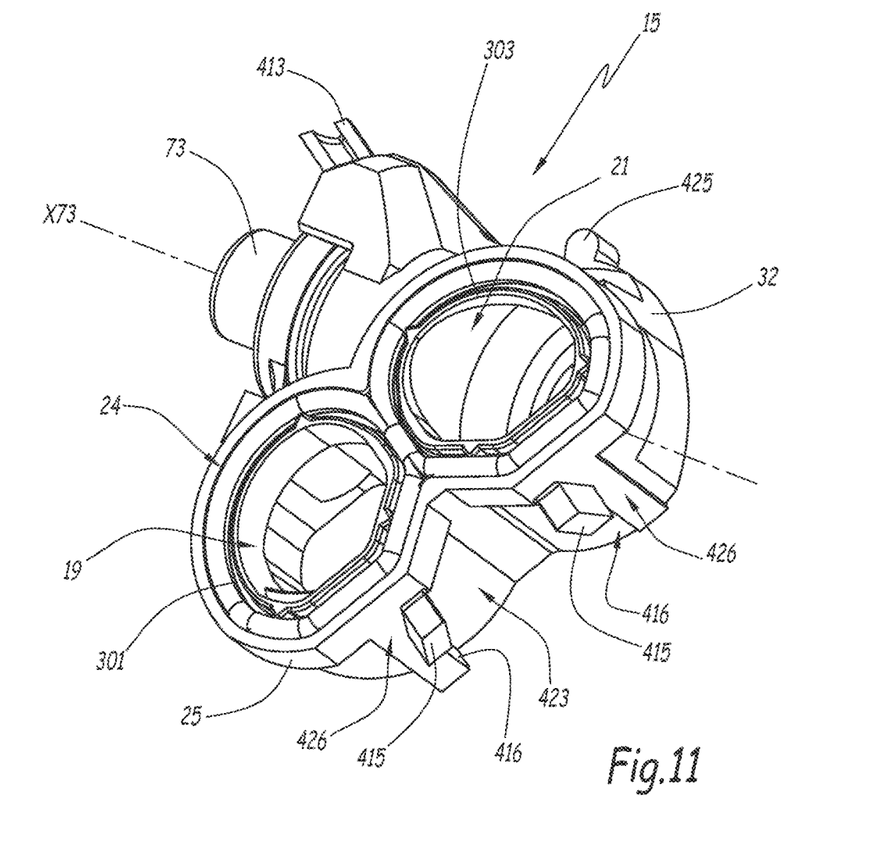
FIG. 11 shows a perspective view of an additional housing belonging to the mixing unit of FIG. 8 to 10.

These attachment means comprise two retaining claws 414 protruding from the parapet 421 in opposite directions and orthoradially with respect to the axis X2, as illustrated in particular in FIGS. 8 and 10. These retaining claws 414 are positioned to interact respectively with two lugs 415, wherein these lugs 415 protrude from an edge 416 of the recessed portion 423 of the additional housing 15. The retaining claws 414 are positioned at a sufficient distance from the coupling base 45 so that the additional housing 15 may move between two end positions in one of which the lugs 415 are in contact with the retaining claws 414, while being retained along the axis X2 by these retaining claws 414. When the lugs 415 are thus retained by the claws 414, the additional housing 15 is in the attachment configuration. As may be seen in the figures, the lugs 415 are placed on either side of the parapet 421. The claws 414 and the lugs 415 have a shape and an elasticity which allow the additional housing 15 to be easily arranged in the attachment configuration, which requires a crossing of the claws 414 by the lugs 415, wherein this crossing requires a temporary mutual deformation of the claws 414 and lugs 415. As may be seen in FIG. 8, the claws 414 each have a sloping surface that comes into contact with a reciprocally inclined surface of the pin 415 in question, in order to facilitate the passage of the pin 415 beyond the claw 414 when the additional housing 15 is moved along the axis X2 towards the cartridge 11. The crossing in the opposite direction of the claws 414 by the lug 415 is made difficult by the presence of surfaces orthogonal to the axis X2, or at least with a strong inclination on the claws 414 and on the lugs 415.

The mixing unit 202 comprises other means of attaching the additional housing 15 to the cartridge 11, which comprise, on the one hand, a lug 413 which protrudes from the additional housing 15 opposite the recessed portion 423, and, on the other hand, a hook 417 which is arranged on the coupling base between the two walls 321. When the additional housing 15 is in the attachment configuration, the lug 413 is retained by the hook 417 in translation, parallel to the axis X2, in a direction opposite to the cartridge 11. Thus, the hook 417 maintains the additional housing 15 in the attachment configuration while allowing the movement of the latter along the axis X2. The end of the hook 417 has a shape similar to that of the claws 414 defined above, so that the lug 413 is held in the same way by the hook 417 as the lugs 415 are held by the claws 414.

Some parts of the additional housing 15 are, for example, made of plastic, including the through conduit 25 and the baffle conduit 32, which advantageously form a single piece. The elements 425 are advantageously provided on the additional housing 15 to facilitate the extraction of the plastic parts from a manufacturing mold. For example, these elements 425 each protrude from a peripheral surface of the additional housing 15. In particular, as may be seen in FIG. 10, the elements 425 protrude respectively from the through conduit 25 and from the baffle conduit 32.

In the preceding examples, flows of water are used. However, other fluids may be used instead of water, preferably liquid fluid flows. In general, the inlet 5 corresponds to an inlet of a first inflow F1 of fluid having a first temperature Tf, whereas the inlet 6 corresponds to an inlet of a second inflow C1 of fluid having a second temperature Tc, which is higher than the first temperature Tf. The fluids of the first inflow F1 and the second inflow C1 are preferably identical and liquid, but may however be of a different nature. The water issuing from the spout 3 thus corresponds to an outflow M1 of fluid, which is formed by mixing the first and second inflows F1 and C1 within the mixer tap 1.

In the foregoing examples, four separate and distinct seals 301, 303, 305 and 307 are used. In a variant not shown, the lower seals 301 and 303 are connected to form a single "8" shaped seal. Likewise, the intermediate seals 305 and 307 may be connected to form a single "8" shaped seal.

The embodiments and variants defined above may be combined to create new embodiments.

What is claimed is:

1. A mixing unit for a mixer tap, comprising:
   a cartridge, which includes mixing means for mixing fluid flows, and is provided with a coupling base provided with:
      a first inlet of a first inflow of fluid having a first temperature,
      a second inlet of a second inflow of fluid having a second temperature that is greater than the first temperature, and
      an outlet for an outflow obtained by means of the mixing means, by mixing the first inflow and the second inflow, and
   a housing, which is designed to be placed in a coupling position with the coupling base, wherein the housing encloses thermostatic means which, when the housing is in the coupling position, are designed to change the flow rate of the first inflow and/or the second inflow according to the outflow temperature,
   wherein the mixing unit further comprises attachment means for arranging the housing in an attachment configuration of the housing on the coupling base, in which configuration the attachment means allow movement of the housing relative to the cartridge between the coupling position and a separated position of the housing relative to the cartridge, and wherein in the separated position, the attachment means are designed to retain the housing in the attachment configuration.

2. The mixing unit according to claim 1, wherein the cartridge has a generally cylindrical shape, defining a cartridge axis and terminating in the coupling base which is traversed by the cartridge axis, wherein the attachment means are so designed that the displacement of the housing is effected in a direction of movement substantially parallel to the cartridge axis.

3. The mixing unit according to claim 2, wherein the coupling base comprises positioning means of the housing rotated about the cartridge axis relative to the cartridge, wherein the positioning means allow a translation of the housing along the cartridge axis relative to the cartridge.

4. The mixing unit according to claim 3, wherein the positioning means comprise a parapet protruding from the coupling base parallel to the cartridge axis, wherein the housing comprises, at its periphery, a recessed portion for receiving the parapet.

5. The mixing unit according to claim 2, wherein the attachment means comprise at least one retaining claw, integral with the coupling base, and at least one lug protruding from the housing, wherein the lug is designed to be retained between the claw and the coupling base in the attachment configuration, wherein the claw is positioned to allow movement of the housing between two end positions along the cartridge axis defining the movement.

6. The mixing unit according to claim 1, wherein the attachment means comprise, on the one hand, at least one lug, protruding from the housing, and, on the other hand, a hook, arranged on the coupling base, and designed to receive the lug in the attachment configuration, in order to maintain this lug within the hook while allowing a movement of the lug in the hook between two end positions defining the movement.

7. The mixing unit according to claim 1, wherein the mixing unit comprises at least one seal of the coupling between the housing and the coupling base, wherein the coupling position of the housing causes crushing of the seal in order to ensure the sealing of the coupling of the housing on the coupling base.

8. The mixing unit according to claim 1, wherein the housing comprises:
   a first side intended to bear against the coupling base when the housing is in the coupling position,
   a second side opposite to the first side, and
   at least one first conduit and a second conduit passing through the housing from the first side to the second side, and designed to be connected respectively to the first inlet and the second inlet at the first side when the housing is in the coupling position.

9. A mixer tap comprising a receiving body of a mixing unit according to claim 1, wherein the receiving body comprises:
   an annular wall defining a body axis and designed to receive the mixing unit therein by sliding along the body axis,
   a coupling plate of the housing, which is integrally arranged within the annular wall,
   clamping means, along the body axis, of the mixing unit against the coupling plate, allowing, on the one hand, a coupling position of the housing with the coupling base, and, on the other hand, a coupling position of the housing with the coupling plate.

10. A method of manufacturing a mixer tap according to claim 1, wherein the method comprises the following successive steps:
   a) arrangement in the attachment configuration of the housing on the coupling base, in the extended position, by means of the attachment means which are then loaded,
   b) introduction of the mixing unit thus formed into the receiving body until the mixing unit abuts against the coupling plate,
   c) clamping the mixing unit against the coupling plate, in order to move the housing from the separated position to the coupling position with the coupling base, so that the attachment means are no longer loaded.

* * * * *